A. KRAUT.
DISH WASHING DEVICE.
APPLICATION FILED MAY 8, 1914.
1,139,426.
Patented May 11, 1915.
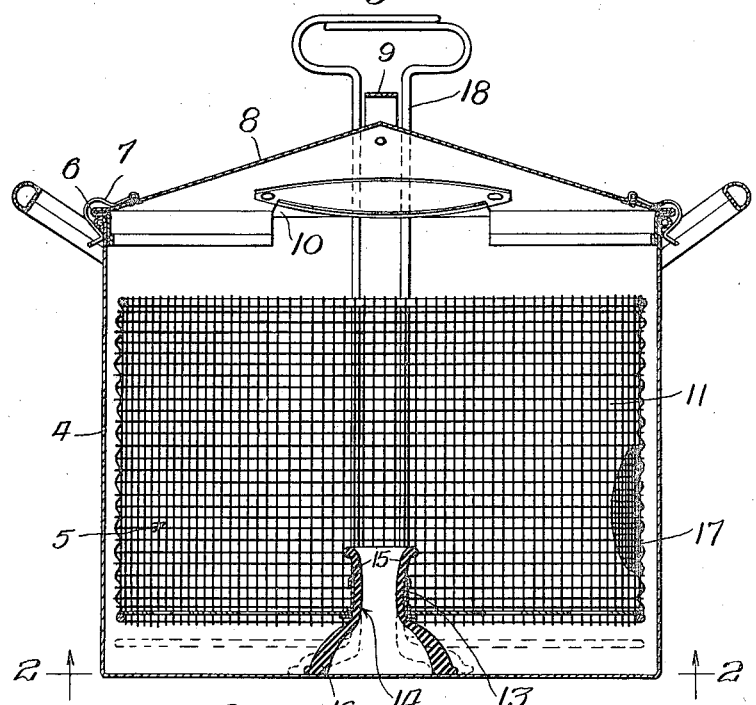
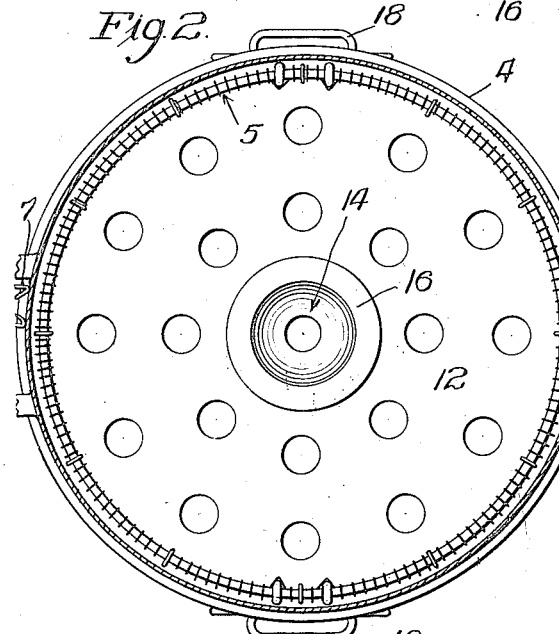
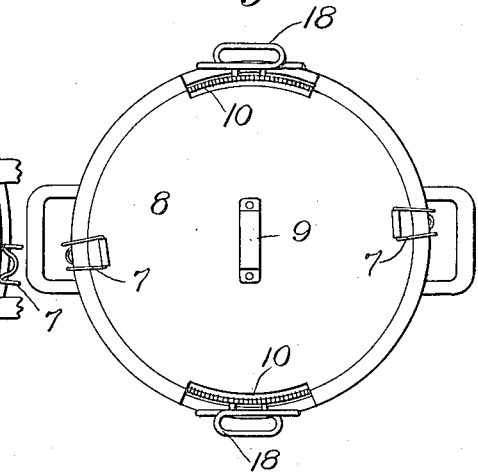
Witnesses:
Inventor
Anna Kraut

UNITED STATES PATENT OFFICE.

ANNA KRAUT, OF CHICAGO, ILLINOIS.

DISH-WASHING DEVICE.

1,139,426.

Specification of Letters Patent.   Patented May 11, 1915.

Application filed May 8, 1914. Serial No. 837,136.

*To all whom it may concern:*

Be it known that I, ANNA KRAUT, a citizen of the United States, residing at Chicago, in the county of Cook and State of Illinois, have invented certain new and useful Improvements in Dish-Washing Devices, of which the following is a specification.

This invention relates to a means for cleansing dishes and similar articles, and particularly to a device which can be manually operated.

In the embodiment of my invention, I have sought to combine features of efficiency, simplicity, and strength; to provide improved means for forcing water into contact with the articles under treatment; to safeguard the dishes from shocks and jars, such as would tend to cause breakage; and to generally arrange, proportion, and design the various parts to facilitate the washing operation. The invention further consists in numerous other features of construction and combinations of parts as will hereinafter appear.

In the drawing: Figure 1 is a vertical cross section through a device embodying my invention; Fig. 2 is a transverse section taken on line 2—2 of Fig. 1; and Fig. 3 is a plan view (scale of reduced size) of the device.

The washer herein described consists essentially of two major elements, an imperforate cylindrical vessel 4 and a cylindrical basket 5 therewithin. The upper edge of the vessel is outwardly flanged with a bead 6, over which hooks 7 attached to a cover 8 may clamp to lock the cover in place. This cover for convenience is equipped with a handle 9, and differs in no way from other articles of its kind except that peripheral slots 10 are therein provided, as best appears in Fig. 3.

The basket 5 is constructed of perforate cylindrical walls 11, preferably formed of a heavy wire mesh, and a bottom 12 secured thereto in any suitable manner. This bottom I have represented as consisting of a sheet of metal punched with a number of holes to allow passage of a limited amount of water therethrough. Centrally in this bottom and extending a short distance into the basket is a nipple 13 within which a hollow member 14 is supported. This member which is constructed of flexible material, such as rubber, embodies a neck portion 15 and a scoop-shaped open mouth portion 16 adapted to rest squarely against the bottom of the vessel. I have also shown attached to the inner side of the basket a receptacle 17 adapted to retain soap therewithin to assist in the cleansing operation, and two handles 18 extending from the basket out through the slots 10 to a point exteriorly of the vessel for convenience in manipulation.

From the foregoing description, the operation of the device will be apparent. A quantity of boiling water is first poured into the vessel to a level approximating that of the basket bottom when in raised position, after which the basket laden with dishes to be washed is positioned operatively in the vessel. The cover is then secured in position so that the vessel is entirely closed except for the slots 10, through which the handles protrude. The handles of the basket are manipulated to effect an up and down movement, as well as a limited rotary movement. Through the openings in the bottom of the basket water will be forced actively against the dishes to cleanse the same. The soap contained in the receptacle 17 is passed vigorously through the water to soften the same and produces suds, such as are necessary for cleansing purposes.

The member 14 is very active in enhancing the efficiency of the cleansing operation, as with each down stroke water is scooped and trapped within its mouth, and by compression of its sides is forced through the neck into the basket interior and against the dishes with considerable force. Besides serving to augment the force with which the water is directed against the dishes, this member acts also as a resilient stop for the basket on its down stroke, thus preventing a breakage of dishes which otherwise might ensue. The rubber member acts also as a central bearing, thus facilitating reciprocal rotary movements of the basket.

It is to be noted that the bottom of the basket consists of a metal plate with openings arranged at certain intervals therein. These openings are intended to permit liquid to pass therethrough in certain definite directions or streams, and not promiscuously as would be the case in a wire mesh bottom. Since the sum total area of these openings is considerably less than that of the whole bottom, it follows that, during movements of operation, liquid is forced therethrough with considerable force against the surface of the dishes to aid in cleansing the same. Such liquid as enters through the basket sides on the down stroke is driven laterally with great force due to the pressure exerted by the operator, and coöperates with the jets or streams proceeding through the basket bottom to produce very efficient cleansing results.

In devices of rather large size, where a large number of dishes are to be washed, such as might be used by hotels or restaurants, I prefer to utilize more than one resilient member in the basket bottom, so that additional jets or streams are forced against the surfaces of the dishes to wash and cleanse a greater number during one operation.

I claim:

1. A dish washing device comprising in combination with an imperforate vessel, a perforate basket arranged to fit into the vessel, the bottom of said basket being provided with a plurality of openings through which liquid may pass, and a resilient member carried by said basket bottom having a flaring mouth capable of engaging with the vessel bottom, and provided with an opening leading from the mouth thereof to the vessel interior, whereby the compression of said resilient member causes a stream of water to be forced therethrough into the basket, substantially as described.

2. A dish washing device comprising in combination with a cylindrical imperforate vessel, a perforate cylindrical basket arranged to fit within said vessel, the bottom of said basket being substantially the same in size as the inside diameter of said vessel and being provided with a plurality of openings through which liquid may pass, and a resilient member carried by said basket bottom having a flaring mouth capable of engaging with the vessel bottom, and provided with an opening leading from the mouth thereof to the vessel interior, whereby the compression of said resilient member causes a stream of water to be forced therethrough into the basket, substantially as described.

3. A dish washing device comprising in combination with an imperforate vessel, a perforate basket positioned within said vessel and capable of being moved in longitudinal and rotary directions, said basket being provided with a bottom in which a plurality of openings are formed for the passage of liquid therethrough, and a resilient member carried by said basket bottom having a flaring mouth capable of engaging with the vessel bottom, and provided with an opening leading from the mouth thereof to the vessel interior, whereby the compression of said resilient member causes a stream of water to be forced therethrough into the basket, substantially as described.

4. A dish washing device comprising in combination with an imperforate vessel, a perforate basket arranged to fit into said vessel, the bottom of said basket being provided with a plurality of openings through which liquid may pass, a hollow resilient member carried by said basket bottom having a neck extending into the interior of the basket, and a flaring mouth arranged exteriorly of the basket bottom capable of engaging with the vessel bottom, whereby the compression of said member causes a stream of water to be delivered into the basket at a point removed from the bottom thereof, substantially as described.

5. A dish washer embodying in combination a vessel, a basket vertically reciprocable therein, the bottom whereof is provided with an opening, and a hollow resilient member secured within said opening arranged to allow passage of liquid therethrough into the basket interior, the resilient member being shaped to provide a flaring mouth extending beneath the basket bottom to engage with the vessel bottom, substantially as described.

6. A dish washer embodying in combination a vessel, a dish retainer vertically reciprocable within the vessel, the bottom of said retainer being provided with an opening through which communication is established between the interior of the dish retainer and the vessel, and resilient means operatively arranged within said opening capable when compressed of forcing a stream of liquid therethrough when the dish retainer is reciprocated within the vessel.

ANNA KRAUT.

Witnesses:
EPHRAIM BANNING,
WM. P. BOND.